United States Patent [19]
Gerber

[11] 3,942,411
[45] Mar. 9, 1976

[54] ROTARY CUTTING APPARATUS

[75] Inventor: Heinz Joseph Gerber, West Hartford, Conn.

[73] Assignee: Gerber Garment Technology, Inc., East Hartford, Conn.

[22] Filed: Mar. 25, 1974

[21] Appl. No.: 451,346

[52] U.S. Cl. .............. 90/11 A; 83/100; 83/925 CC; 90/12 D
[51] Int. Cl.² ......................................... B23C 1/06
[58] Field of Search.......... 90/15, 11 R, 11 A, 12 D, 90/DIG. 12; 83/925 CC; 408/97, 98

[56] References Cited
UNITED STATES PATENTS

| | | | |
|---|---|---|---|
| 3,119,210 | 6/1964 | Doeder | 90/11 A |
| 3,587,391 | 6/1971 | Pitts | 90/11 R |
| 3,626,796 | 12/1971 | Pearl | 83/925 CC X |
| 3,830,122 | 8/1974 | Pearl | 83/925 CC X |

*Primary Examiner*—Harrison L. Hinson
*Assistant Examiner*—Leon Gilden
*Attorney, Agent, or Firm*—McCormick, Paulding & Huber

[57] ABSTRACT

A cutting apparatus employs a cutting wheel which is rotated about an axis perpendicular to a support surface on which sheet material is positioned for cutting. A stripping plate is mounted in closely spaced relationship with the cutting wheel so that shredded material generated by the wheel during a cutting operation is sheared off. The cutting wheel in a cutting operation is advanced relative to the sheet material so that the leading cutting edges of the wheel, rather than the trailing edges, move along the desired line of cut. The material being cut is positioned on a bed that can be penetrated by the wheel and the depth of penetration of the wheel into the bed is regulated to remain substantially constant as the tool moves along the line of cut.

14 Claims, 6 Drawing Figures

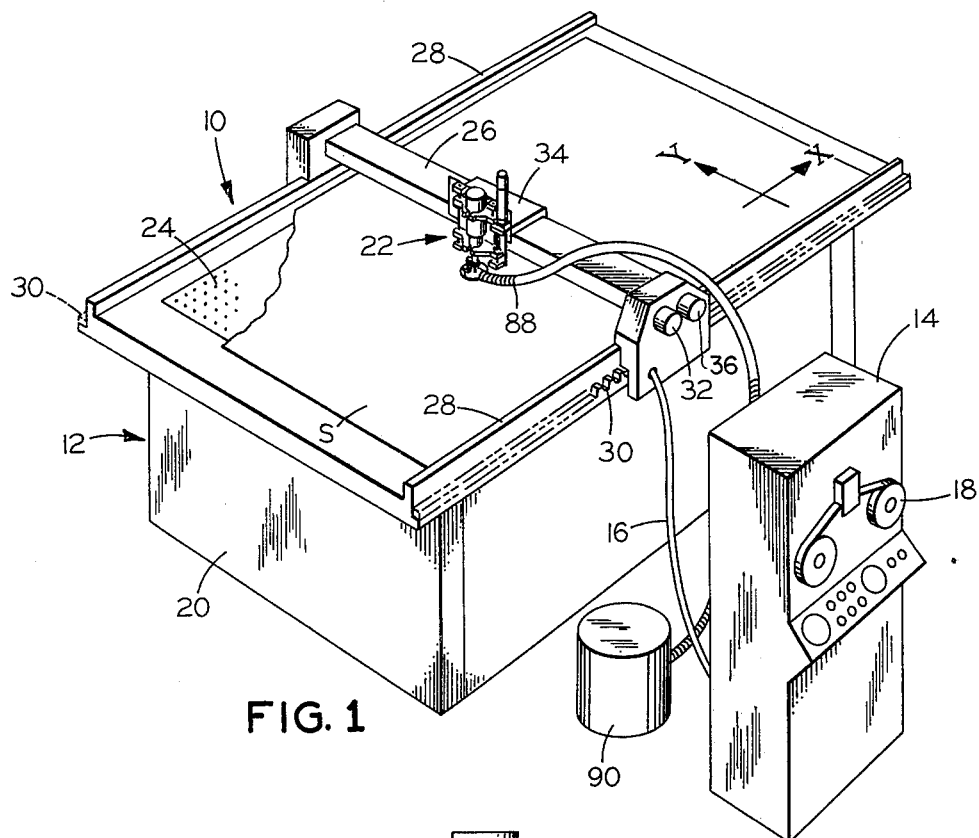
FIG. 1
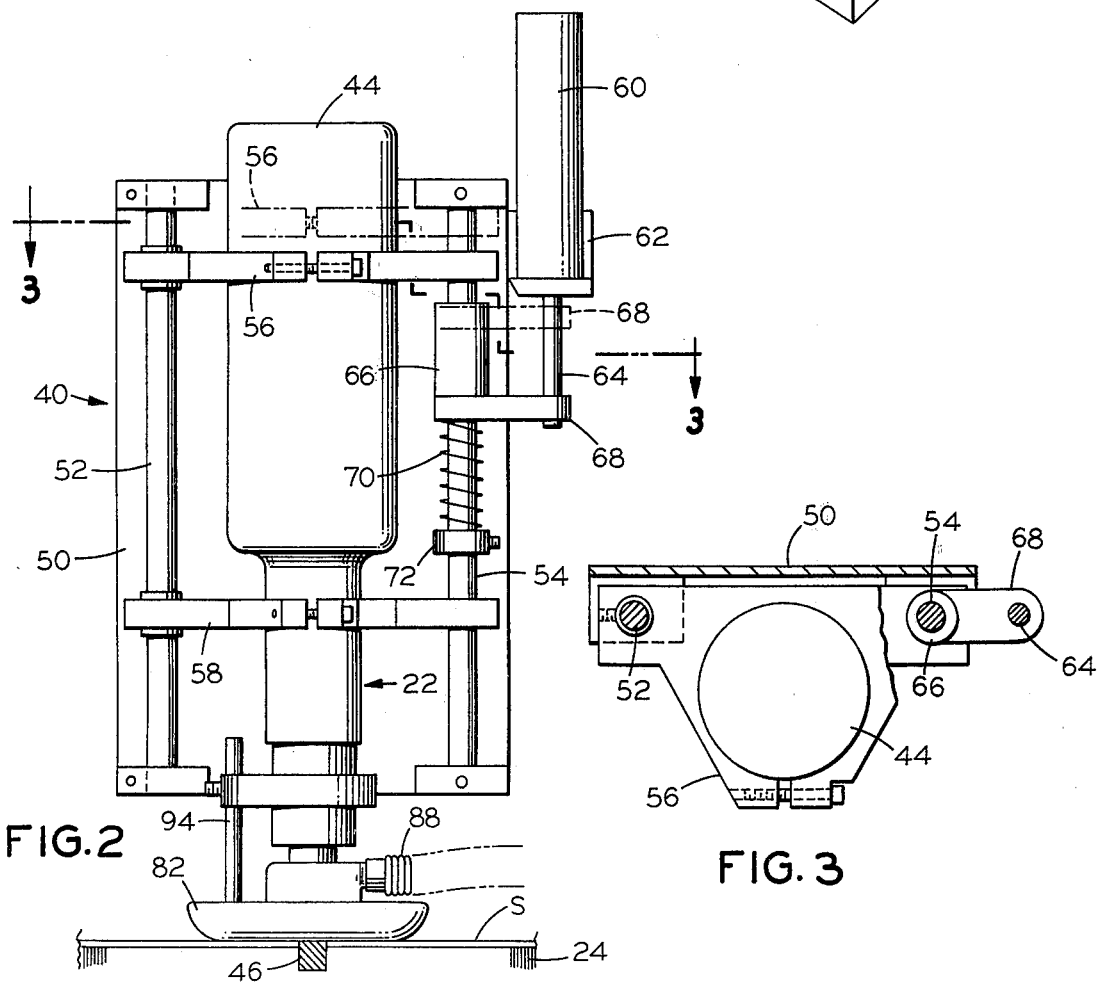
FIG. 2
FIG. 3

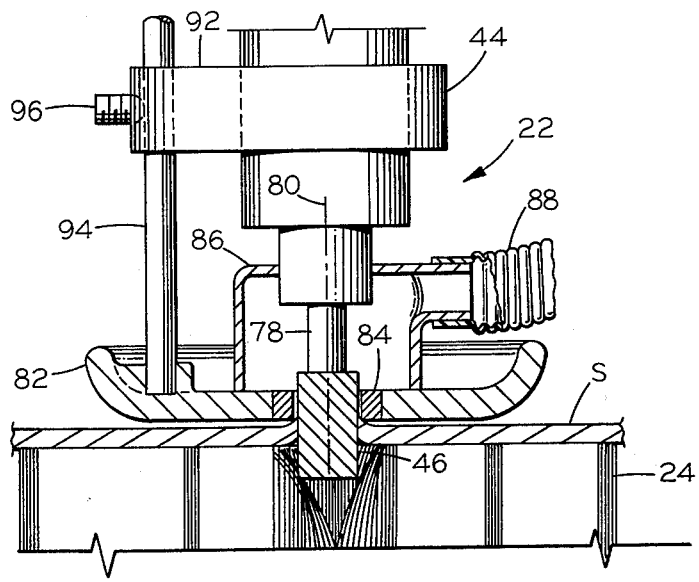
FIG. 4
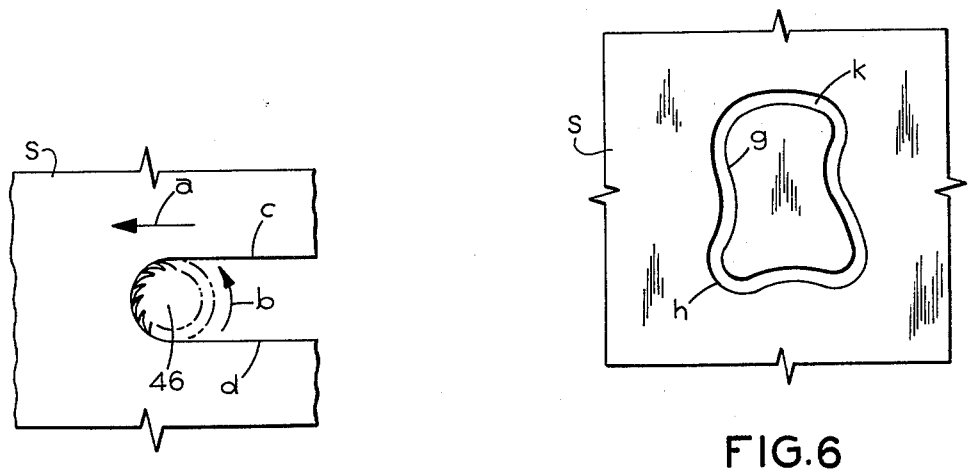
FIG. 5
FIG. 6

ROTARY CUTTING APPARATUS

BACKGROUND OF THE INVENTION

The present invention relates to an apparatus for cutting and, more particularly, is concerned with a method and apparatus for cutting patterns from sheet material such as cardboard, plastics, thin metal and similar sheet materials.

It is already well known to cut pattern pieces from sheet material by means of an automatically controlled cutting machine. Such patterns may be used as templets or guides in future cutting operations or for other purposes. In the garment industry, it is well known to use such patterns to lay out a marker, that is the array of patterns as they are cut from a piece or layup of fabric material.

U.S. Pat. No. 3,477,322 issued on November 11, 1969 illustrates and describes an automatically controlled cutting machine which produces two dimensional pattern pieces from a cutting program defined in a memory device, such as a magnetic tape, a punched tape or a deck of punched cards. The cutting program can also be generated "on line," that is, the cutting operation is carried out simultaneously with the marker generation process or the operation determining the shapes of the pattern pieces, for example, a pattern grading operation.

It is also known, as indicated by U.S. Pat. No. 3,495,492 issued on Feb. 17, 1970 and having the same assignee as the present application, to utilize a numerically controlled cutting machine to cut out the actual garment, upholstery or other pieces from a layup of limp fabric material in accordance with a marker that has previously been formed from a plurality of patterns.

The cutting of patterns from cardboard and the like and the cutting of the actual garment or upholstery pieces from a layup of limp sheet material has been performed in the past with different cutting tools on different cutting tables because of the different natures of the two cutting operations. In generating patterns, only a few layers of cardboard, not generally exceeding three, are cut at a single time and, therefore, a chisel-type tool such as shown in U.S. Pat. No. 3,477,322 operating against a relatively rigid surface supporting the cardboard sheet material is adequate. On the other hand, the cutting machine which cuts out the garment or upholstery pieces from a multiply layup of limp fabric sheet material utilizes a reciprocating type cutting blade and the table supporting the layup has a penetrable support bed that is penetrated by the reciprocating blade as shown and described in U.S. Pat. No. 3,495,492. Another related cutting machine with a reciprocating cutting blade is shown in U.S. Pat. No. 3,533,320 which discloses a pair of conveyors placed end to end to establish an intermediate throatway through which the reciprocating cutting blade operates while the fabric material is moved under the blade by the conveyors.

Although the cutting tools and the support beds of fabric cutting machines differ from the tool and bed used to generate patterns, much of the equipment including the control computers and carriages which translate the tools and materials relative to one another is basically the same and represents a substantial portion of the cost of the cutting machines. If a single, automatically controlled machine could be adapted to perform both operations, substantial savings would be had. Pattern cutting and layup cutting could be performed on a single machine in which the high-cost portions, that is the control computer, the basic support table and carriage drive mechanisms, are utilized in both operations.

It is, accordingly, a general object of the present invention to disclose a cutting machine which is adapted to both pattern cutting and fabric cutting operations. More particularly, it is an object of the present invention to disclose apparatus which uses the basic supporting table, control computers and drive carriages of a fabric cutting machine for cutting patterns.

SUMMARY OF THE INVENTION

The present invention resides in an apparatus for cutting workpieces such as sheet materials including cardboard, plastic, thin metals and the like.

The apparatus includes support means defining a support surface on which the workpiece is placed during a cutting operation. In a preferred form of the invention, the support means is a penetrable bed formed by bristles having their free ends in a common plane defining the support surface on which sheet material may be placed in a flattened condition.

A cutting tool for cutting patterns or templets from the sheet material is positioned over the support surface on which the workpiece is placed. The tool includes a cutting wheel having cutting edges arranged coaxially of an axis of rotation which is located in perpendicular relationship to the support surface during cutting. A stripping member is also included as part of the cutting tool and is arranged coaxially of the wheel in closely spaced relationship with the cutting edges. The stripping member cooperates with the cutting edges to shear chips or shredded material which is cut from the workpiece.

Controlled drive means connected with the support means and the tool translate the tool and workpiece relative to one another parallel to the work surface. During translation, the tool advances through the workpiece along a desired line of cut which defines, for example, the periphery of the pattern to be generated.

The rotating cutting wheel is suitable for cutting materials such as cardboard, heavy paper or plastic or thin metals which may later be used as patterns or templets for cutting pieces from a multiply layup of fabrics on the same support means with a reciprocating cutting blade. The support means is normally provided with a penetrable bed that cooperates with the reciprocating cutting blade during a layup cutting operation, and the rotating cutting wheel utilized for generating patterns is entirely compatible with such a penetrable bed because the wheel must generally extend below the support surface to perform its cutting operation. Where the support surface is defined by a bristled bed, the bed is effectively a non-destructive bed since the free ends of the bristles can deflect away from the wheel as it advances through a workpiece. Movement of the wheel through sheet material is preferably controlled to cause the advancing or leading cutting edges to follow the desired line of cut. The depth of penetration of the wheel through the sheet material and into the penetrable bed is also regulated to maintain substantially the same plane of the wheel in cutting relationship with the material.

BRIEF DESCRIPTION OF THE DRAWINGS

FIG. 1 is a perspective view showing one embodiment of the cutting apparatus in accordance with the present invention.

FIG. 2 is a front elevation view of the cutting tool and tool mount utilized in the apparatus of FIG. 1.

FIG. 3 is a sectional view of the cutting tool and tool mount as viewed along the sectioning line 3—3 of FIG. 2.

FIG. 4 is an enlarged fragmentary view of the rotating cutting wheel in cutting engagement with sheet material on a penetrable support table.

FIG. 5 is a fragmentary plan view showing the rotating cutting wheel as it translates in a given direction through the sheet material.

FIG. 6 is a fragmentary view of the sheet material illustrating the kerf along a closed cutting path that is formed by the rotating cutting wheel of the present invention.

DESCRIPTION OF THE PREFERRED EMBODIMENTS

FIG. 1 illustrates one embodiment of the apparatus of the present invention. The apparatus, generally designated 10, includes an automatically controlled cutting machine 12 including a control computer 14 and interconnecting cabling 16. The computer 14 reads a cutting program from a program tape 18 and translates the programmed information into command signals which control the operation of the cutting machine 12 to cause patterns of selected shapes to be cut from sheet material such as cardboard, plastic, thin metal or similar workpieces. Other automatic pattern programming equipment may also be used as input devices for the cutting machine so that cutting programs can be produced "on line" or simultaneously with the cutting operation.

The cutting machine 12 includes a cutting table 20 for supporting the sheet material S in a flat condition, and a cutting tool 22 which is translated over the table in cutting relationship with the material. The table 20 has a support bed 24 which in a preferred form of the invention is a penetrable bed that may be comprised of bristled mats arranged in adjacent relationship so that the free ends of the bristles project upwardly to a common plane and define a support surface in that plane on which the sheet material may be placed in a flattened condition. The bed may also be provided with a vacuum system to generate a low pressure region at the support surface and thereby hold the sheet material fixedly in position during a cutting operation. A cutting table having a penetrable bed of this type is described and shown in greater detail in U.S. Pat. No. 3,765,289 issued Oct. 16, 1973 and having the same assignee as the present application. As indicated in the patent, such a table along with the control computer 14 is adapted for cutting layups of fabric material with a reciprocating cutting blade as well as for cutting patterns in accordance with the present invention.

A pair of tool supporting carriages 26 and 34 are mounted above the bed 24 for translating the tool 22 back and forth over the support surface in the illustrated X and Y coordinate directions. The X-carriage 26 is supported at the lateral sides of the table on a pair of rails or ways 28 extending parallel to the X-coordinate direction. Gear racks 30 adjacent the ways 28 are engaged by pinions (not shown) which are mounted on the X-carriage 26 and which are operated by an X-drive motor 32 in response to command signals generated by the computer 14 and transmitted to the table through the cabling 16.

The Y-carriage 34 is mounted on the X-carriage 26 and is movable relative to the X-carriage 26 and the penetrable bed 24 in the illustrated Y-direction. A lead screw (not shown) but threadably engaged by the Y-carriage 34 is rotatably driven by a Y-drive motor 36 in response to commands received from the computer 14. Composite motions of the X- and Y-carriages translate the cutting tool 22 over the support surface of the bed 24 and advance the tool along a desired or programmed cutting path to cut a pattern from the sheet material S. If desired, several layers of sheet material may be stacked upon the bed 24 for simultaneous cutting by the tool 22.

Although the cutting machine 12 is adapted to utilize reciprocating cutting tools for cutting fabric layups, the cutting tool 22 illustrated and described in greater detail below is utilized for cutting patterns.

FIGS. 2 and 3 illustrate the cutting tool 22 and the tool mount 40 that attaches the tool to the Y-carriage 34 in place of a reciprocating cutting tool such as described in U.S. Pat. No. 3,495,492 or U.S. patent application Serial No. 398,255 filed Sept. 17, 1973 and entitled CUTTING APPARATUS WITH SHARPENER AND SHARPENING METHOD. The tool 22 is comprised principally of a drive motor 44 and a rotatable cutting wheel 46 mounted on the drive shaft of the motor.

The tool mount 40 includes a mounting plate 50 which is fixedly secured in a preselected position to the Y-carriage 34 by bolts and dowel pins (not shown) and a pair of slide rods 52 and 54 fixedly secured to the mounting plate 50. A slide assembly is formed by the rods 52, 54 and a pair of clamping brackets 56 and 58 which are clamped to the motor 44 and slide up and down on the rods 52 and 54 in a vertical direction relative to the support surface of the penetrable bed 24 shown in FIG. 1.

An actuator 60 controlled by commands from the computer 14 is also supported from the mounting plate 50 by means of a bracket 62 for dropping the cutting tool 22 downwardly onto the support bed and bringing the cutting wheel 26 into cutting engagement with the sheet material S. The actuator 60 may be singleacting pneumatic or electrical actuator having an operating rod 64 which is lowered or pushed outwardly of the housing of the actuator when power is applied. The actuating rod 64 is connected to a sliding sleeve 66 on the rod 54 by a link 68 so that the sleeve is pushed downwardly by the energized actuator to allow the bracket 56 to move downwardly from its phantom position to the position shown. It will be understood that such movement of the bracket 56 is also accompanied by a corresponding downward movement of the bracket 58, the motor 44 and the cutting tool 22 so that the cutting wheel 46 engages the sheet material S on the penetrable bed of the cutting table 20. The downward displacement of the sleeve 66 is greater than the displacement of the motor 44 needed to bring the cutting wheel 46 into engagement with the sheet material so that the weight of the motor and brackets forces the cutting wheel to penetrate through the sheet material. Of course, it is also possible that drill flutes could be added to the lower side of the cutting wheel 46 to insure penetration through heavier sheet materials such as plastics or thin metals.

The cutting wheel 46 is lifted out of cutting engagement with the sheet material by the compression spring 70 interposed between the link 68 and a collar 72 fixed to the slide rod 54 when the actuator 60 is deenergized. The spring 70 pushes the sleeve 66 upwardly against the bracket 56 and lifts the bracket upwardly to its phantom position along with the motor 44 and the cutting wheel 46. Since the compression spring 70 opposes to operation of the actuator, the mechanism for moving the cutting wheel 46 in and out of cutting engagement with the sheet material is fail-safe to the extent that the wheel 46 is disengaged from the material by the spring whenever power for the actuator 60 is lost. The sheet material, therefore, will not be cut unless the system receives the power needed.

FIG. 4 illustrates the lower end of the cutting tool 22 in greater detail during a cutting operation. The cutting wheel 46 on the drive shaft 78 has a plurality of helical cutting edges which are coaxially arranged about the common axis 80 of rotation of the drive shaft 78 and the wheel 46. A presser foot 82 for holding the sheet material down is coaxially positioned about the wheel 46 and includes a hardened stripping plate 84 for shearing chips or shredded material from the sheet material S. The stripping plate 84 in one form is an annular hard steel or tungsten carbide bushing press-fitted into an aperture within the foot 82 and has an inner periphery in close-fitting relationship with the cutting edges of the wheel 46.

During a cutting operation, the wheel 46 is rotated in a direction which permits the helical cutting edges to pull the sheet material upwardly in a peaked position such as that shown. Shreds of the sheet material are cut between the wheel and closely fitted stripping member and are pulled further upwardly through the presser foot by the helical edges into a vacuum chamber. The chamber is formed by a closed sleeve 86 attached to the presser foot 82 and surrounding the upper end of the wheel 46 and the lower end of the drive shaft 76. A vacuum hose or conduit 88 is connected to the sleeve 86 and leads from the carriage 26 to a vacuum pump 90 as shown in FIG. 1 to evacuate air from the chambers. The vacuum hose 88 is a flexible hose that follows the cutting tool 22 over the support surface of the table 20 during the cutting operation and together with the vacuum pump 90 aids the cutting wheel in drawing the shredded material upwardly through the presser foot to a low pressure region in the vacuum chamber and away from the table.

The presser foot 82 is attached to the lower end of the motor 44 by means of a stationary bracket 92, a support rod 94 which can slide up and down within the bracket 92 and a set screw 96 for fixing the presser foot 82 and rod 94 adjustably relative to the bracket 92 and the cutting wheel 46. The presser foot is adjusted to a position which permits the cutting wheel 46 to extend downwardly through the sheet material S and into the penetrable bed 24 of bristles when the bottom or pressing surface of the foot rests on the sheet material. In FIG. 4, the pressing surface of the foot appears to be spaced above the sheet material but such illustration is merely for the purpose of illustrating the peaked condition of the sheet material produced by the helical cutting edges of the wheel 46. Though the wheel penetrates partially into the penetrable bed, the bristles forming the bed 24 are deflected away from the wheel without injury. The bristles, therefore, provide a nondestructible bed for supporting the sheet material.

Adjustment of the support rod 94 and the presser foot 82 relative to the motor 44 changes the portion of the cutting wheel 46 which is brought into engagement with the sheet material S. Thus, if one portion of the wheel becomes dulled by extensive cutting, the height of the wheel relative to the bed 24 can be adjusted so that another portion of the wheel engages the sheet material. Also, if the thickness of the sheet material or the number of plies is increased, it may be necessary to adjust the presser foot so that at least some portion of the wheel remains below the support surface of the bed to insure complete severance of the material along the cutting path being followed. Since the presser foot 82 regulates the depth to which the cutting wheel penetrates the bed 24, the unevenness in the support surface will have little effect upon the depth of penetration below the support surface.

It has been found that in the cutting materials such as tagboard, that is, a high quality cardboard used in the garment industry for patterns, it is preferable to translate the cutting wheel 46 in a specified manner so that the advancing or leading cutting edges track along the desired line of cut. The leading cutting edges are the cutting edges at one side of the wheel having a tangential velocity generally parallel to and with the same sense as the translation of the wheel. Therefore, when the wheel 46 is rotated about the axis 80 perpendicular to the support surface and is advanced along a cutting path parallel to the support surface, the leading cutting edges are at one side of the advancing wheel. The cutting edges at the diametrically opposite side of the wheel move with a sense opposite that of the wheel advancement and are defined as the trailing cutting edges. It has been noted in this regard that the leading and trailing edges produce lines of cut in the sheet material which lines are slightly different in quality. For example, in FIG. 5, when the cutting wheel 46 advances in the direction of the arrow $a$ and is rotated in the direction indicated by the arrow $b$, the line of cut $c$ generated by the leading cutting edges has a quality superior to the line of cut $d$ generated by the trailing edges. Due to the fact that the leading cutting edges are cutting into the sheet material while the trailing cutting edges are cutting out of the sheet material, the line $c$ is sharply formed and distinct while the line $d$ frequently has a frayed appearance attributed to the line by shreds which are not cut cleanly away from the rest of the sheet material. Such fraying results in spite of the stripping plate 84 in the presser foot 82.

Accordingly, it is desirable to pre-program the memory tape 18 or program the control computer 14 to coordinate the direction of rotation of the cutting wheel and the direction of translation of the wheel so that the leading cutting edges advance along the desired line of cut. For example, FIG. 6 shows a kerf $k$ that is produced in the sheet material by the cutting wheel when the wheel circumnavigates a closed cutting path. If the wheel is rotated in a clockwise direction and the exterior profile $g$ of the inner pattern is the desired profile, then the cutting wheel should be translated in a counterclockwise direction tangentially about the pattern to insure that the leading cutting edges produce the profile $g$. On the other hand, if the interior profile $h$ on the outer pattern surrounding the kerf is the desired profile, the cutting wheel should be translated in the clockwise direction about the closed cutting path.

It will, of course, be noted that both of the profiles g and h in FIG. 6 are slightly different profiles, one being larger than the other due to the diameter of the cutting wheel. In generating patterns to be used as, for example, templets in laying out a marker to be cut from a layup of fabric material, if the diameter of the wheel 46 is small, that is in the range of 0.030 – 0.100 of an inch, the rotational axis 80 of the wheel can be moved precisely along a cutting path corresponding to that which will be followed by a reciprocating cutting blade in the fabric even though the resulting pattern may be slightly undercut by an amount equal to the radius of the wheel. Such undercutting merely compensates for the thickness of a pencil that is later used to trace the outline of the pattern either directly on the fabric material or on a marker defining the array of pieces to be cut from the fabric material. Of course, if precise correspondence of the pattern being cut and the fabric piece to be cut is desired, the wheel must be offset to a tangential position at one side or the other of the desired cutting path depending upon whether an interior or exterior profile pattern is desired. If the direction in which a cutting tool moves along a desired profile is limited by other factors, the direction of rotation of the drive motor for the cutting wheel and the pitch of the helical cutting edges may be reversed so that the leading cutting edges may always produce the desired line of cut, and a lifting force pulls the sheet material toward the stripping plate.

While the present invention has been described in a preferred embodiment, it should be understood that numerous modifications and substitutions can be had without departing from the spirit of the invention. For example, it is not essential that a vacuum chamber be utilized to draw the shreddings away from the cutting wheel during a cutting operation. A positive pressure system possibly utilizing the drive motor 44 may be used to blow the shreddings from the wheel into a conduit that leads to a suitable disposal. The stripping plate 84 may be mounted to the presser foot 82 in a manner different from that shown or may be mounted from the casing of the motor 44 independently of the presser foot. The mounting within the presser foot, however, is preferred since it places the member directly above the sheet material and insures shearing of the chips from the material as soon as they are generated by the cutting wheel 46. The suspension of the cutting tool by means of the specific slide assembly shown is not essential and it is contemplated that a fully automated slide assembly and adjustable actuator may be used to positively position the cutting wheel and presser foot at specified stations above the cutting surface or the sheet material. Accordingly, the present invention has been described in a preferred embodiment by way of illustration rather than limitation.

I claim:

1. Apparatus for cutting a workpiece such as sheet material comprising:

support means defining a support surface on which the workpiece may be placed during a cutting operation;

a cutting tool positioned over the support surface for cutting the workpiece, the tool including a cutting wheel having cutting edges arranged coaxially of an axis of rotation located in perpendicular relationship to the support surface and a stripping member arranged coaxially of the wheel and in cooperating close-fitting relationship with the cutting edges to shear chips being cut from the workpiece; and controlled drive means connected with the support means and the tool for translating the tool and the workpiece relative to one another parallel to the work surface to advance the tool through the workpiece along a desired line of cut.

2. Apparatus for cutting a workpiece as defined in claim 1 wherein:

the support means comprises a support bed having a support surface defined by a material nondestructively penetrated by the tool.

3. Apparatus for cutting as defined in claim 2 wherein the support bed is comprised of a bed of bristles having free ends defining the support surface.

4. Apparatus for cutting as defined in claim 1 wherein the support means comprises a vacuum bed for holding the workpiece on the work surface.

5. Apparatus for cutting a workpiece as defined in claim 1 wherein:

the cutting wheel has helical cutting edges coaxially arranged about the axis of rotation.

6. Apparatus for cutting as defined in claim 1 further including:

a tool mount translatable with the tool relative to the support means, the tool mount including one portion movable toward and away from the support surface to move the cutting wheel in and out of cutting engagement with the workpiece on the support surface.

7. Apparatus for cutting as in claim 6 wherein the tool mount includes controlled actuating means for moving the tool in and out of cutting engagement with the workpiece on command.

8. Apparatus for cutting as in claim 7 wherein the actuating means includes a spring urging the tool and the one movable portion of the mount away from the support surface and an actuator opposing the spring when actuated.

9. Apparatus for cutting as defined in claim 6 wherein:

a presser foot having a pressing surface is connected to the movable portion of the tool mount with the pressing surface in predetermined relationship with the cutting wheel to expose a selected portion of the wheel.

10. Apparatus for cutting as defined in claim 9 wherein the presser foot connection with the movable portion of the tool mount is adjustable to expose different selected portions of the wheel.

11. Apparatus for cutting as defined in claim 1 wherein:

a presser foot is connected with the cutting tool for translation with the tool over the support surface; and the stripping member is an annular member surrounding the cutting wheel in closely spaced relationship with the cutting edges and is mounted on the presser foot.

12. Apparatus for cutting as defined in claim 1 wherein the cutting tool includes a rotational drive motor for rotating the cutting wheel about the axis of rotation, and the cutting edges on the wheel are helical cutting edges pitched in accordance with the direction of motor rotation to apply a force lifting the workpiece away from the support surface and toward the stripping member.

13. Apparatus for cutting as defined in claim 1 wherein:

the cutting tool includes a rotational drive motor for rotating the cutting wheel about the axis of rotation while the tool advances along a selected line of cut whereby the leading cutting edges are disposed at one side of the cutting wheel and trailing cutting edges are disposed at the diametrically opposite side; and means are provided within the control means for advancing the side of the cutting wheel having the leading cutting edges along the desired line of cut.

14. Apparatus for cutting as defined in claim 1 further including:

a vacuum pump; and conduit means having one end connected with the pump and another end supported adjacent the stripping member and the cutting wheel for drawing away shreddings of the sheet material made by the cutting wheel.

* * * * *